(12) United States Patent
Koga et al.

(10) Patent No.: US 11,702,283 B2
(45) Date of Patent: Jul. 18, 2023

(54) ELECTRIC POWER TAKE-OFF FOR A REFUSE VEHICLE

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Nader Nasr, Neenah, WI (US); Chad K. Smith, Omro, WI (US); Logan Gary, Oshkosh, WI (US); Derek A. Wente, Austin, MN (US); Shawn Naglik, Oshkosh, WI (US); Mike J. Bolton, Oshkosh, WI (US); Jacob Wallin, Oshkosh, WI (US); Quincy Wittman, Oshkosh, WI (US); Christopher J. Rukas, Oshkosh, WI (US); Dylan Hess, Oshkosh, WI (US); Jason Rice, Oshkosh, WI (US); Zhenyi Wei, Oshkosh, WI (US); Bashar Amin, Oshkosh, WI (US); Catherine Linsmeier, Oshkosh, WI (US); Joshua D. Rocholl, Rochester, MN (US); Dale Matsumoto, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 17/538,018

(22) Filed: Nov. 30, 2021

(65) Prior Publication Data

US 2022/0097964 A1 Mar. 31, 2022

Related U.S. Application Data

(63) Continuation of application No. 17/327,229, filed on May 21, 2021, now Pat. No. 11,254,498.
(Continued)

(51) Int. Cl.
*B65F 3/02* (2006.01)
*B60L 1/00* (2006.01)
(Continued)

(52) U.S. Cl.
CPC ............... *B65F 3/02* (2013.01); *B60K 25/00* (2013.01); *B60L 1/003* (2013.01); *B60L 3/0046* (2013.01);
(Continued)

(58) Field of Classification Search
CPC ............. B65F 3/02; B60K 25/00; B60L 1/003
See application file for complete search history.

(56) References Cited

U.S. PATENT DOCUMENTS

| 3,802,585 | A | * | 4/1974 | Churchman | .............. | B65F 3/28 414/512 |
|---|---|---|---|---|---|---|
| 5,897,123 | A | | 4/1999 | Cherney et al. | | |

(Continued)

*Primary Examiner* — Jonathan Snelting
(74) *Attorney, Agent, or Firm* — Foley & Lardner LLP

(57) ABSTRACT

A refuse vehicle includes a chassis, an energy storage device, a body, and an electric power take-off system. The energy storage device (e.g., a battery) is supported by the chassis and is configured to provide electrical power to a prime mover. Activation of the prime mover selectively drives the refuse vehicle. The body is configured for storing refuse, and is supported by the chassis. The electric power (Continued)

take-off system is positioned on the body and includes an inverter, an electric motor, and a hydraulic pump that is drive by the electric motor. The inverter receives electrical power from the energy storage device and supplies electrical power to the electric motor. The electric motor drives the hydraulic pump to convert the electrical power into hydraulic power.

14 Claims, 11 Drawing Sheets

Related U.S. Application Data

(60) Provisional application No. 63/084,386, filed on Sep. 28, 2020.

(51) Int. Cl.
*B60L 3/00* (2019.01)
*B60K 25/00* (2006.01)

(52) U.S. Cl.
CPC ............ *B65F 2003/0269* (2013.01); *B65F 2003/0283* (2013.01)

(56) References Cited

U.S. PATENT DOCUMENTS

| | | |
|---|---|---|
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,105,984 A | 8/2000 | Schmitz et al. |
| 6,120,235 A | 9/2000 | Humphries et al. |
| 6,123,500 A | 9/2000 | McNeilus et al. |
| 6,189,901 B1 | 2/2001 | Smith et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,516,914 B1 | 2/2003 | Andersen et al. |
| 6,565,305 B2 | 5/2003 | Schrafel |
| 6,757,597 B2 | 6/2004 | Yakes et al. |
| 6,882,917 B2 | 4/2005 | Pillar et al. |
| 6,885,920 B2 | 4/2005 | Yakes et al. |
| 7,070,382 B2 | 7/2006 | Pruteanu et al. |
| 7,164,977 B2 | 1/2007 | Yakes et al. |
| 7,277,782 B2 | 10/2007 | Yakes et al. |
| 7,284,943 B2 | 10/2007 | Pruteanu et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,392,122 B2 | 6/2008 | Pillar et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,520,354 B2 | 4/2009 | Morrow et al. |
| 7,521,814 B2 | 4/2009 | Nasr |
| 7,556,468 B2 | 7/2009 | Grata |
| 7,559,735 B2 | 7/2009 | Pruteanu et al. |
| 7,689,332 B2 | 3/2010 | Yakes et al. |
| 7,711,460 B2 | 5/2010 | Yakes et al. |
| 7,756,621 B2 | 7/2010 | Pillar et al. |
| 7,848,857 B2 | 12/2010 | Nasr et al. |
| 7,878,750 B2 | 2/2011 | Zhou et al. |
| 7,931,103 B2 | 4/2011 | Morrow et al. |
| 7,937,194 B2 | 5/2011 | Nasr et al. |
| 8,000,850 B2 | 8/2011 | Nasr et al. |
| 8,139,109 B2 | 3/2012 | Schmiedel et al. |
| 8,182,194 B2 | 5/2012 | Pruteanu et al. |
| 8,215,892 B2 | 7/2012 | Calliari |
| 8,333,390 B2 | 12/2012 | Linsmeier et al. |
| 8,337,352 B2 | 12/2012 | Morrow et al. |
| 8,360,706 B2 | 1/2013 | Addleman et al. |
| 8,540,475 B2 | 9/2013 | Kuriakose et al. |
| 8,561,735 B2 | 10/2013 | Morrow et al. |
| 8,807,613 B2 | 8/2014 | Howell et al. |
| 8,864,613 B2 | 10/2014 | Morrow et al. |
| 8,947,531 B2 | 2/2015 | Fischer et al. |
| 9,008,913 B1 | 4/2015 | Sears et al. |
| 9,045,014 B1 | 6/2015 | Verhoff et al. |
| 9,114,804 B1 | 8/2015 | Shukla et al. |
| 9,132,736 B1 | 9/2015 | Shukla et al. |
| 9,174,686 B1 | 11/2015 | Messina et al. |
| 9,216,856 B2 * | 12/2015 | Howell .................. B65F 3/143 |
| 9,315,210 B2 | 4/2016 | Sears et al. |
| 9,376,102 B1 | 6/2016 | Shukla et al. |
| 9,387,985 B2 | 7/2016 | Gillmore et al. |
| 9,420,203 B2 | 8/2016 | Broggi et al. |
| 9,428,042 B2 | 8/2016 | Morrow et al. |
| 9,452,750 B2 | 9/2016 | Shukla et al. |
| 9,493,921 B2 | 11/2016 | Amin et al. |
| 9,656,640 B1 | 5/2017 | Verhoff et al. |
| 9,707,869 B1 | 7/2017 | Messina et al. |
| 9,821,789 B2 | 11/2017 | Shukla et al. |
| 9,880,581 B2 | 1/2018 | Kuriakose et al. |
| 10,029,556 B2 | 7/2018 | Morrow et al. |
| D843,281 S | 3/2019 | Gander et al. |
| 10,315,643 B2 | 6/2019 | Shukla et al. |
| 10,392,000 B2 | 8/2019 | Shukla et al. |
| 10,414,067 B2 | 9/2019 | Datema et al. |
| 10,421,350 B2 | 9/2019 | Morrow et al. |
| 10,434,995 B2 | 10/2019 | Verhoff et al. |
| 10,457,134 B2 | 10/2019 | Morrow et al. |
| D869,332 S | 12/2019 | Gander et al. |
| D871,283 S | 12/2019 | Gander et al. |
| 10,544,556 B2 | 1/2020 | Amin et al. |
| D888,629 S | 6/2020 | Gander et al. |
| 10,703,356 B2 * | 7/2020 | Lacroix ............... F16H 61/0025 |
| 10,800,605 B2 | 10/2020 | Rocholl et al. |
| 10,843,379 B2 | 11/2020 | Rocholl et al. |
| 10,843,549 B2 | 11/2020 | Morrow et al. |
| D905,713 S | 12/2020 | Linsmeier et al. |
| 10,859,167 B2 | 12/2020 | Jax et al. |
| D907,544 S | 1/2021 | Wall et al. |
| 10,901,409 B2 | 1/2021 | Datema et al. |
| D909,934 S | 2/2021 | Gander et al. |
| 10,940,610 B2 | 3/2021 | Clifton et al. |
| 10,987,829 B2 | 4/2021 | Datema et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,021,078 B2 | 6/2021 | Rocholl et al. |
| 11,042,750 B2 | 6/2021 | Wildgrube et al. |
| 11,046,329 B2 | 6/2021 | Clifton et al. |
| 11,052,899 B2 | 7/2021 | Shukla et al. |
| 11,059,436 B2 | 7/2021 | Wildgrube et al. |
| 11,254,498 B1 * | 2/2022 | Koga ..................... B60L 1/003 |
| 2002/0159870 A1 | 10/2002 | Pruteanu et al. |
| 2003/0231944 A1 | 12/2003 | Weller et al. |
| 2004/0071537 A1 | 4/2004 | Pruteanu et al. |
| 2004/0156706 A1 | 8/2004 | Weller et al. |
| 2005/0113988 A1 | 5/2005 | Nasr et al. |
| 2005/0113996 A1 | 5/2005 | Pillar et al. |
| 2005/0119806 A1 | 6/2005 | Nasr et al. |
| 2006/0045700 A1 | 3/2006 | Siebers et al. |
| 2006/0065451 A1 | 3/2006 | Morrow et al. |
| 2006/0066109 A1 | 3/2006 | Nasr |
| 2006/0106521 A1 | 5/2006 | Nasr et al. |
| 2007/0088469 A1 | 4/2007 | Schmiedel et al. |
| 2007/0138817 A1 | 6/2007 | Calliari et al. |
| 2007/0154295 A1 | 7/2007 | Kuriakose |
| 2008/0038106 A1 | 2/2008 | Spain |
| 2008/0059014 A1 | 3/2008 | Nasr et al. |

(56) References Cited

U.S. PATENT DOCUMENTS

| | | |
|---|---|---|
| 2008/0071438 A1 | 3/2008 | Nasr et al. |
| 2008/0150350 A1 | 6/2008 | Morrow et al. |
| 2008/0237285 A1 | 10/2008 | Calliari |
| 2009/0194347 A1 | 8/2009 | Morrow et al. |
| 2010/0116569 A1 | 5/2010 | Morrow et al. |
| 2010/0166531 A1 | 7/2010 | Bauer et al. |
| 2010/0301668 A1 | 12/2010 | Yakes et al. |
| 2011/0312459 A1 | 12/2011 | Morrow et al. |
| 2012/0282077 A1 | 11/2012 | Alberts et al. |
| 2013/0196806 A1 | 8/2013 | Morrow et al. |
| 2015/0283894 A1 | 10/2015 | Morrow et al. |
| 2016/0001765 A1 | 1/2016 | Shukla et al. |
| 2016/0297417 A1 | 10/2016 | Shukla et al. |
| 2016/0361987 A1 | 12/2016 | Morrow et al. |
| 2017/0008507 A1 | 1/2017 | Shukla et al. |
| 2017/0121108 A1 | 5/2017 | Davis et al. |
| 2017/0225888 A1 | 8/2017 | Betz et al. |
| 2017/0341860 A1 | 11/2017 | Dodds et al. |
| 2018/0072303 A1 | 3/2018 | Shukla et al. |
| 2018/0129241 A1 | 5/2018 | Kuriakose et al. |
| 2018/0265289 A1 | 9/2018 | Davis et al. |
| 2018/0345783 A1 | 12/2018 | Morrow et al. |
| 2019/0039407 A1 | 2/2019 | Smith |
| 2019/0071291 A1 | 3/2019 | Puszkiewicz et al. |
| 2019/0121353 A1 | 4/2019 | Datema et al. |
| 2019/0161272 A1 | 5/2019 | Betz et al. |
| 2019/0185077 A1 | 6/2019 | Smith et al. |
| 2019/0193934 A1 | 6/2019 | Rocholl et al. |
| 2019/0291711 A1 | 9/2019 | Shukla et al. |
| 2019/0322321 A1 | 10/2019 | Schwartz et al. |
| 2019/0344475 A1 | 11/2019 | Datema et al. |
| 2019/0351883 A1 | 11/2019 | Verhoff et al. |
| 2019/0360600 A1 | 11/2019 | Jax et al. |
| 2019/0381990 A1 | 12/2019 | Shukla et al. |
| 2020/0031641 A1 | 1/2020 | Puszkiewicz et al. |
| 2020/0039341 A1 | 2/2020 | Morrow et al. |
| 2020/0102145 A1 | 4/2020 | Nelson et al. |
| 2020/0230841 A1 | 7/2020 | Datema et al. |
| 2020/0230842 A1 | 7/2020 | Datema et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0347857 A1 | 11/2020 | Clifton et al. |
| 2020/0348681 A1 | 11/2020 | Clifton et al. |
| 2020/0348764 A1 | 11/2020 | Clifton et al. |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |
| 2020/0398772 A1 | 12/2020 | Wildgrube et al. |
| 2020/0399057 A1 | 12/2020 | Rocholl et al. |
| 2020/0399058 A1 | 12/2020 | Rocholl et al. |
| 2020/0402325 A1 | 12/2020 | Koga et al. |
| 2021/0002112 A1 | 1/2021 | Puszkiewicz et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0086991 A1 | 3/2021 | Betz et al. |
| 2021/0088036 A1 | 3/2021 | Schubart et al. |
| 2021/0107361 A1 | 4/2021 | Linsmeier et al. |
| 2021/0124347 A1 | 4/2021 | Datema et al. |
| 2021/0143663 A1 | 5/2021 | Bolton |
| 2021/0162630 A1 | 6/2021 | Clifton et al. |
| 2021/0188076 A1 | 6/2021 | Morrow et al. |
| 2021/0213642 A1 | 7/2021 | Datema et al. |
| 2021/0221216 A1 | 7/2021 | Yakes et al. |
| 2021/0225095 A1 | 7/2021 | Koga et al. |
| 2021/0229320 A1 | 7/2021 | Datema et al. |
| 2021/0229755 A1 | 7/2021 | Schwartz et al. |
| 2021/0229908 A1 | 7/2021 | Rocholl et al. |

* cited by examiner

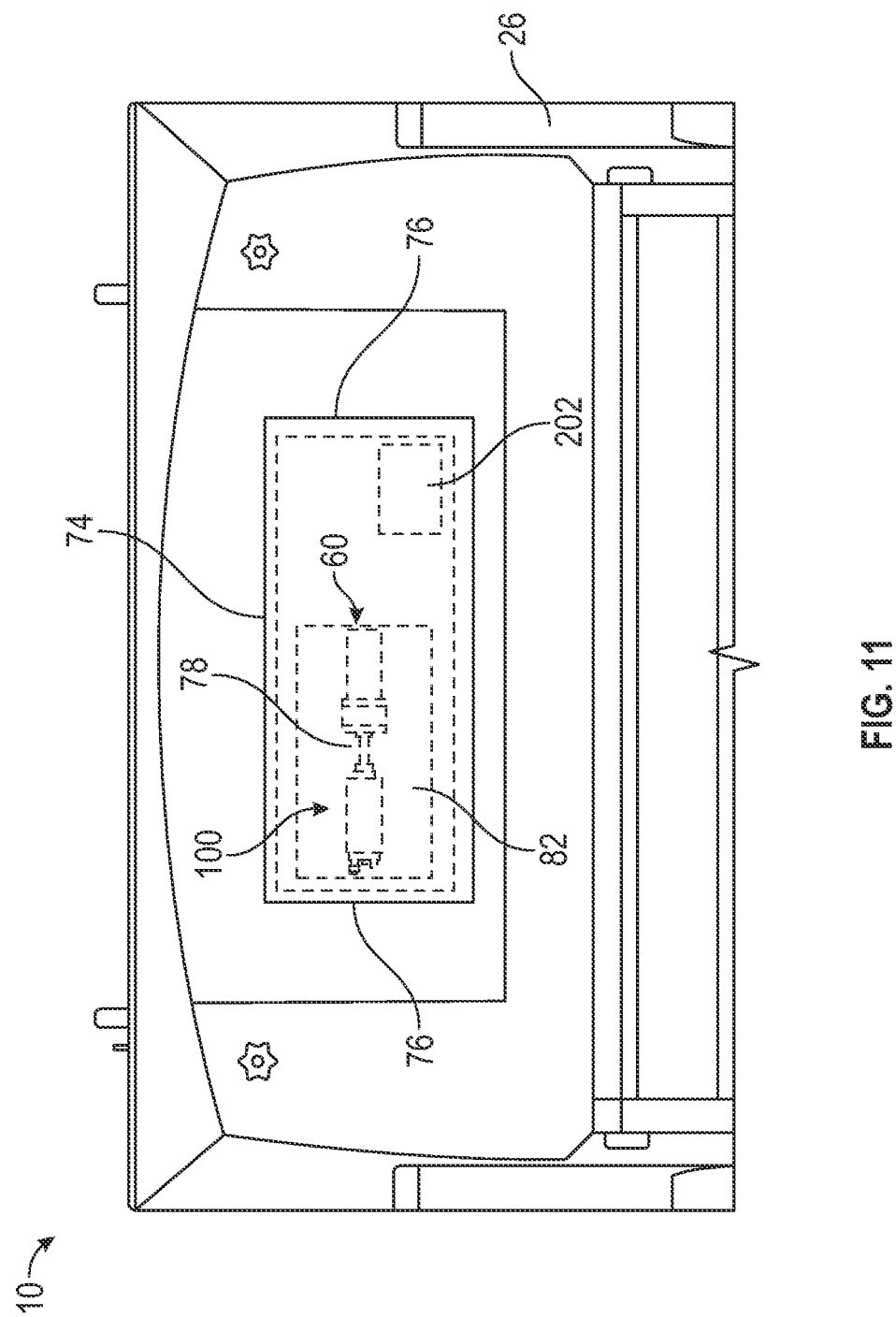

ELECTRIC POWER TAKE-OFF FOR A REFUSE VEHICLE

CROSS-REFERENCE TO RELATED APPLICATION

This Application is a continuation of U.S. patent application Ser. No. 17/327,229, filed May 21, 2021, which claims priority to U.S. Provisional Patent Application No. 63/084,386, filed Sep. 28, 2020, the contents of which are hereby incorporated by reference in their entireties.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor.

SUMMARY

One exemplary embodiment relates to a refuse vehicle. The refuse vehicle includes a chassis, an energy storage device, a body, and an electric power take-off system. The energy storage device (e.g., a battery) is supported by the chassis and is configured to provide electrical power to a prime mover. Activation of the prime mover selectively drives the refuse vehicle. The body is configured for storing refuse, and is supported by the chassis. The electric power take-off system is positioned on the body and includes an inverter, an electric motor, and a hydraulic pump that is driven by the electric motor. The inverter receives electrical power from the energy storage device and supplies electrical power to the electric motor. The electric motor drives the hydraulic pump to convert the electrical power into hydraulic power.

Another exemplary embodiment relates to a vehicle. The vehicle includes a chassis, an energy storage device, a body, and an electric power take-off system. The energy storage device (e.g., a battery) is supported by the chassis and is configured to provide electrical power to a prime mover. Activation of the prime mover selectively drives the vehicle. The body defines a storage compartment that is supported by the chassis. The electric power take-off system is positioned on the body and includes an inverter, an electric motor, and a hydraulic pump that is driven by the electric motor. The inverter receives electrical power from the energy storage device and supplies electrical power to the electric motor. The electric motor drives the hydraulic pump to convert the electrical power into hydraulic power.

Another exemplary embodiment relates to a refuse vehicle. The refuse vehicle includes a chassis, an energy storage device, a receptacle, an electric power take-off system, a lifting system, and a compactor. The energy storage device (e.g., a battery) is supported by the chassis and is configured to provide electrical power to a prime mover. Activation of the prime mover selectively drives the refuse vehicle. The receptacle is configured for storing refuse, and is supported by the chassis. The electric power take-off system is positioned on the body and includes an inverter, an electric motor, and a hydraulic pump that is driven by the electric motor. The inverter receives electrical power from the energy storage device and supplies electrical power to the electric motor. The electric motor drives the hydraulic pump to convert the electrical power into hydraulic power. The lifting system is movable relative to the receptacle using hydraulic power from the electric power take-off system. The compactor is positioned within the receptacle and is movable relative to the receptacle using hydraulic power from the electric power take-off system.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 11 is a rear view of the body assembly of FIG. 7, depicting the second packing for the E-PTO system.

DETAILED DESCRIPTION

Figure 1:
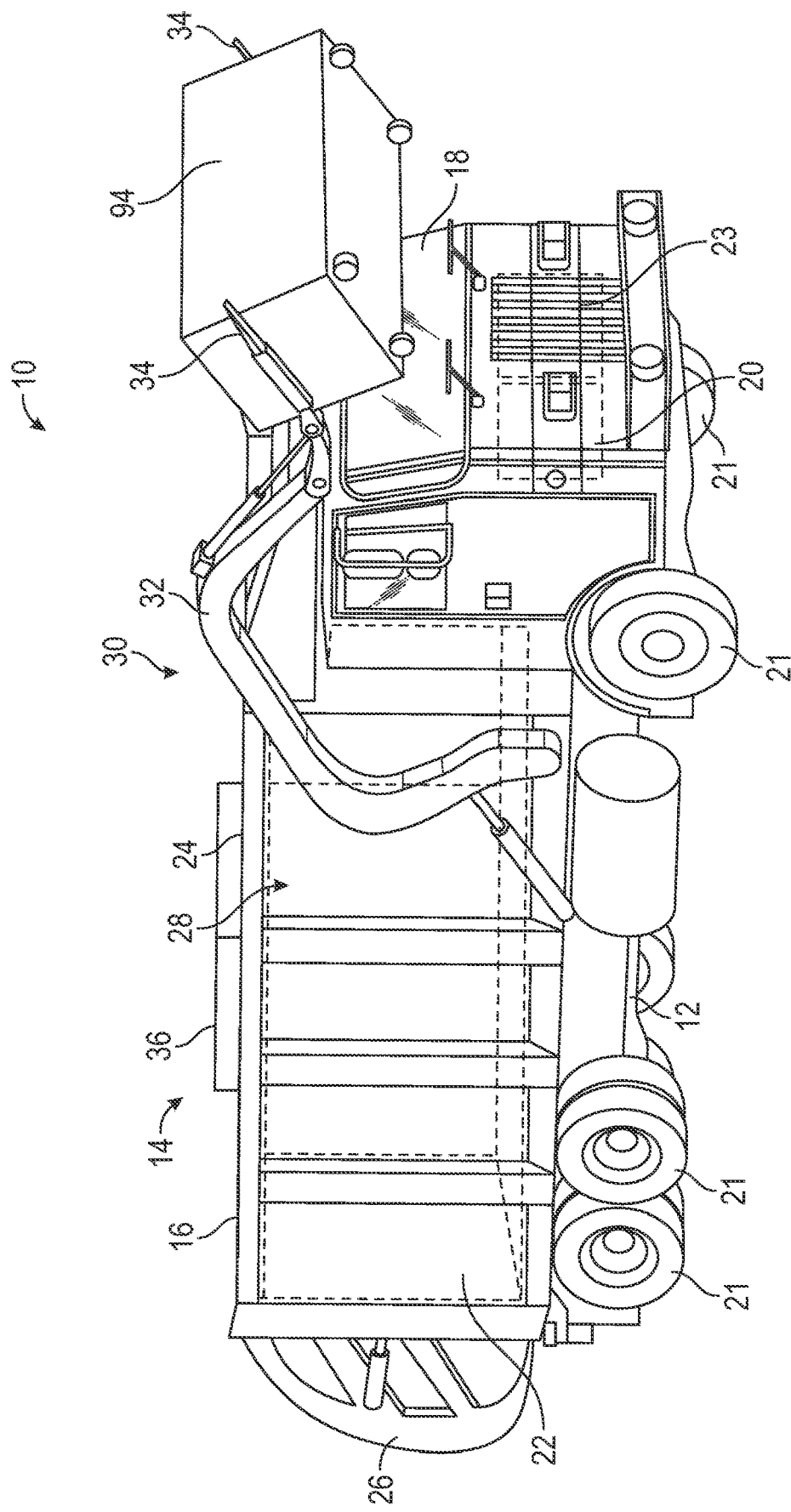
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to electric refuse vehicles. Electric refuse vehicles, or E-refuse vehicles, include an onboard energy storage device, like a battery, that provides power to a motor that produces rotational power to drive the vehicle. The energy storage device, which is commonly a battery, can be used to provide power to different subsystems on the E-refuse vehicle. The energy storage device is also configured to provide hydraulic power to different subsystems on the E-refuse vehicle through an electric power take-off (E-PTO) system. The E-PTO system receives electrical power from the energy storage device and provides the electrical power to an electric motor. The electric motor drives a hydraulic pump that provides pressurized hydraulic fluid to different vehicle subsystems, including the compactor and the lifting system.

The E-PTO system is positioned on the refuse vehicle so that a user can readily access the system on the refuse vehicle in several different operational conditions. For example, the E-PTO system is packaged so that a user can access the E-PTO system regardless of the fill state of the on-board receptacle of the refuse vehicle. The packaging of the E-PTO allows direct access to critical components of the vehicle. The packaging is externally washable and sealed against refuse and environmental intrusion or waste collection. Additionally, the E-PTO system is agnostic to the chassis, and can be readily incorporated into electric refuse vehicles, hybrid refuse vehicles, diesel-powered refuse vehicles, or other chassis styles. The E-PTO system packaging is further designed with a thermal management system that is contained within the body of the refuse vehicle to regulate and cool the E-PTO system.

Referring to FIGS. 1-4, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultra-capacitors, etc.), from an on-board generator (e.g., an internal combustion engine), or from an external power source (e.g., overhead power lines) and provide power to the systems of the refuse truck 10.

Figure 2:
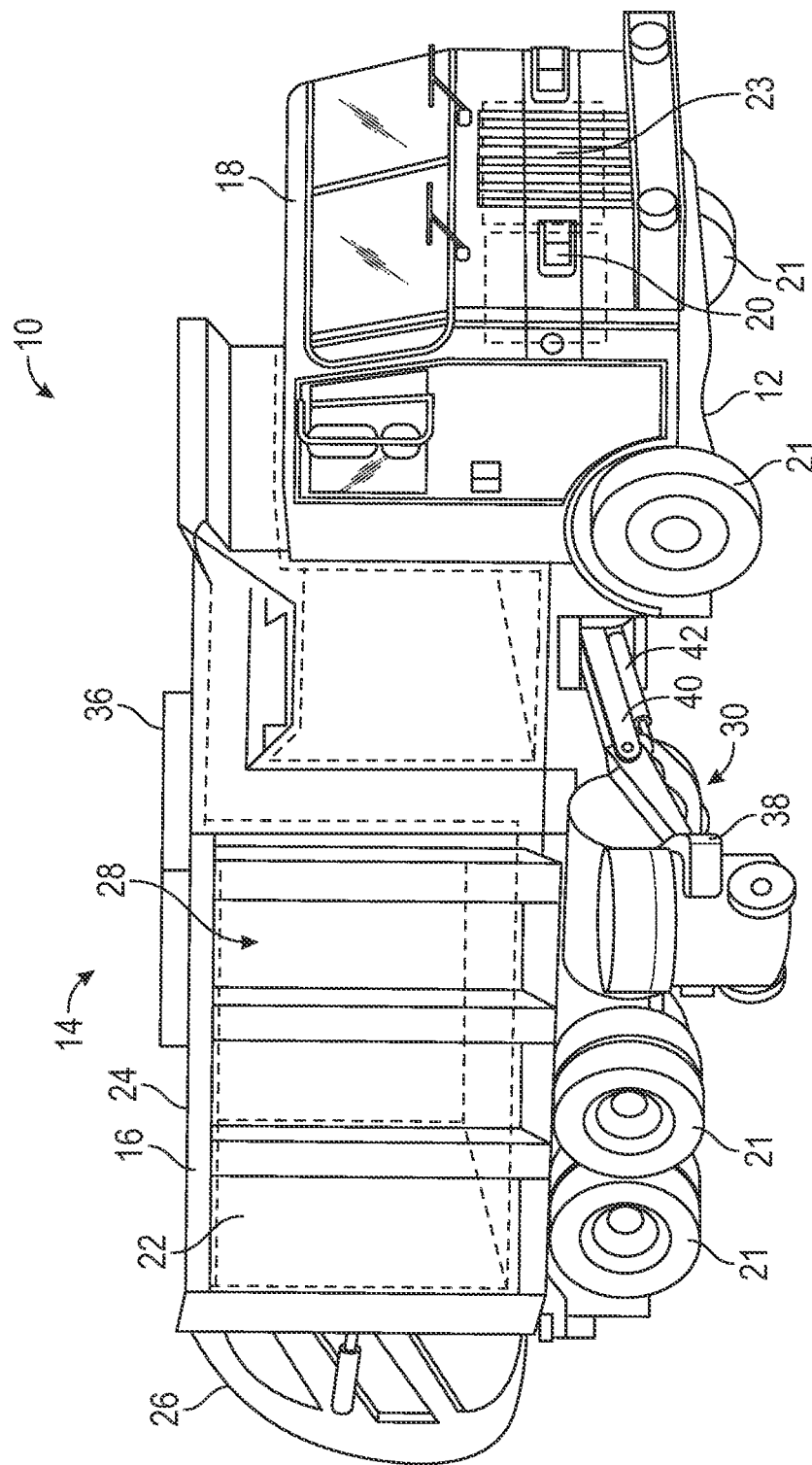
FIG. 2 is a perspective view of a side loading refuse vehicle according to an exemplary embodiment.
Figure 3:
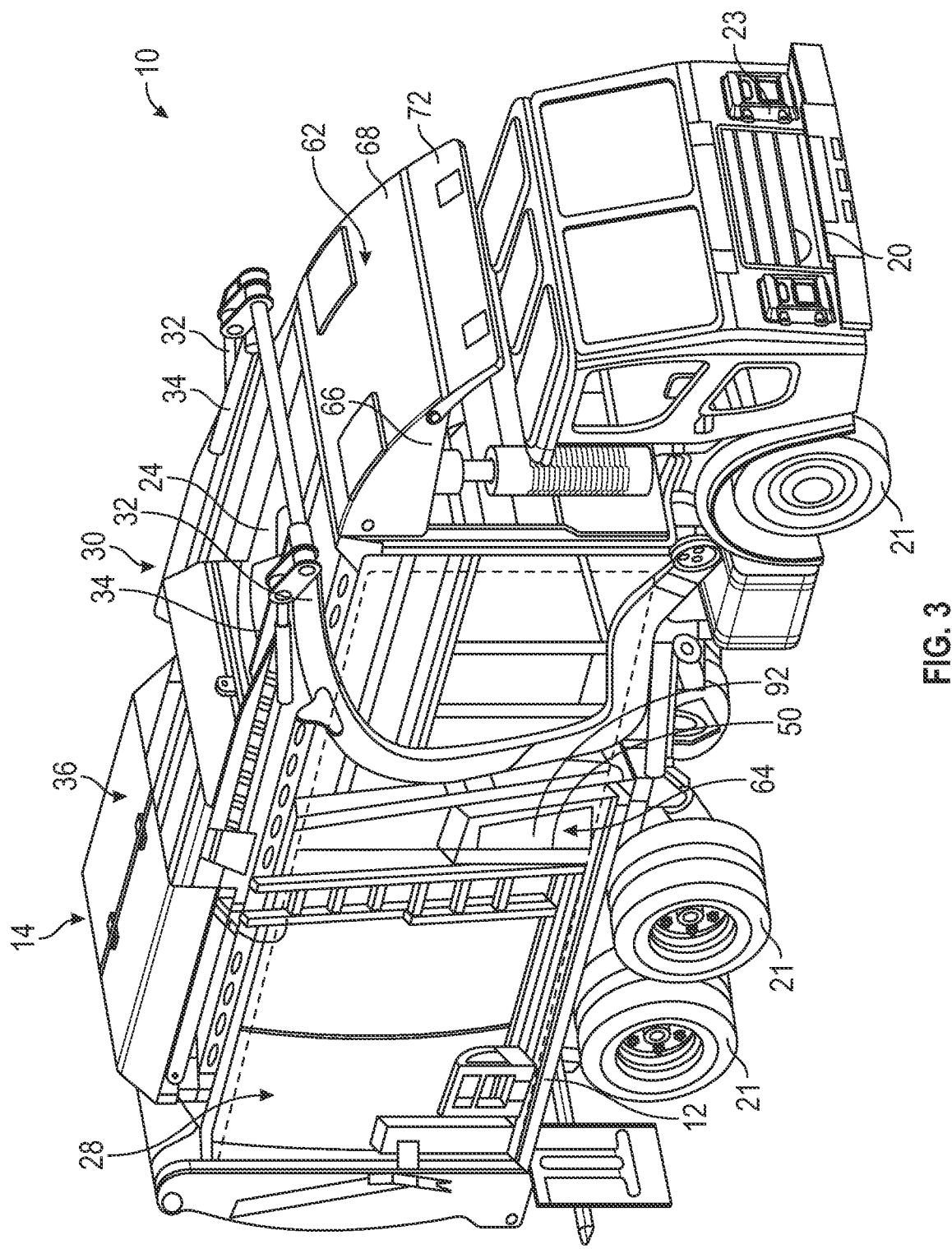
FIG. 3 is a front perspective view of an electric front loading refuse vehicle according to an exemplary embodiment.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-3, the on-board receptacle 16 and collection chamber 28 are each positioned behind the cab 18. In some embodiments, the collection chamber 28 includes a hopper volume and a storage volume. Refuse is initially loaded into the hopper volume and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10).

Referring again to the exemplary embodiment shown in FIG. 1, the refuse truck 10 is a front-loading refuse vehicle. As shown in FIG. 1, the refuse truck 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container 94 (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). As shown in FIG. 1, the arms 32 are rotated to lift the refuse container over the cab 18. A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotationally clockwise and counterclockwise, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Figure 4:
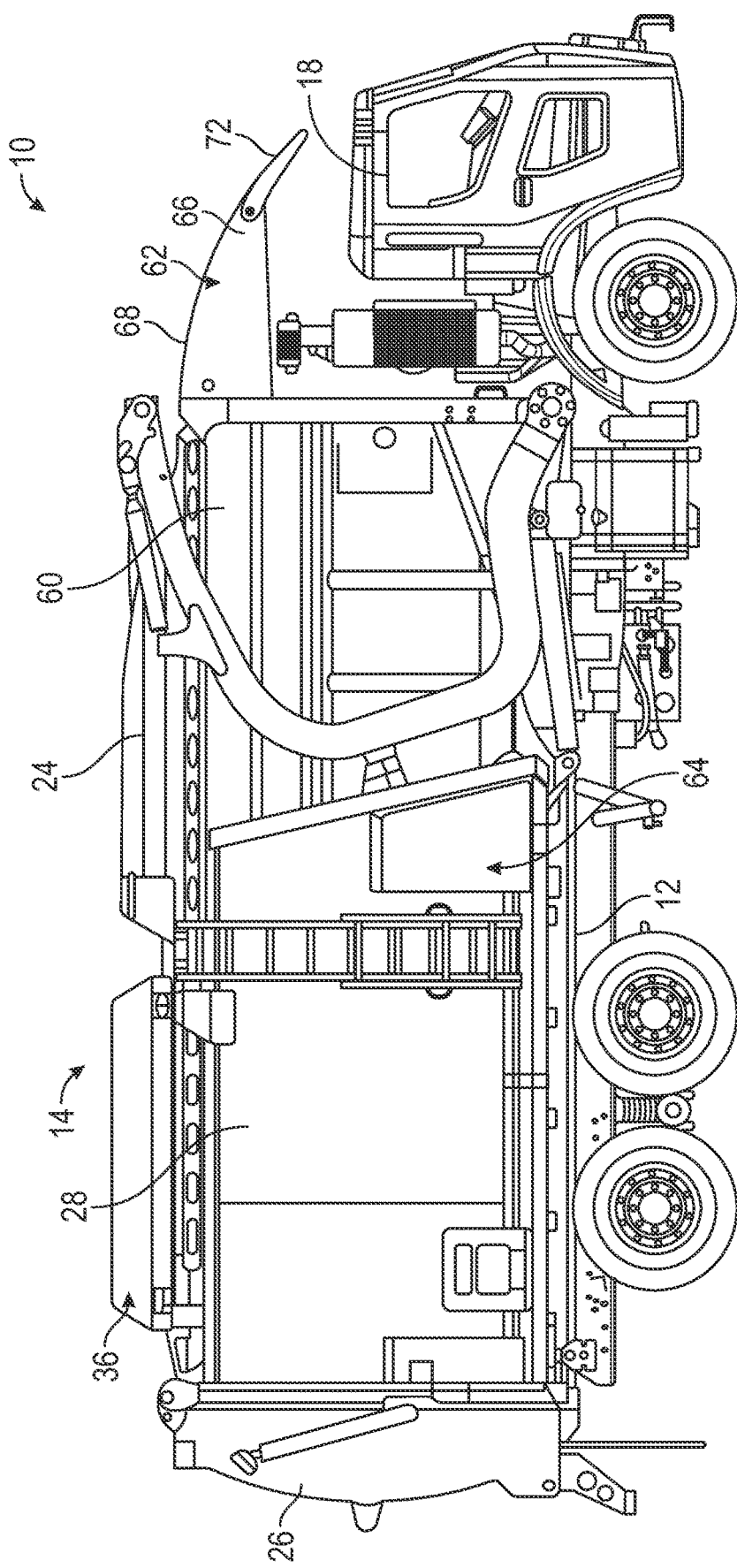
FIG. 4 is a side view of the electric front loading refuse vehicle of FIG. 3.

Referring to FIGS. 3-4, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIGS. 3-4, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse truck 10, including additional electric motors, cab controls (e.g., climate controls, steering, lights, etc.), the lifting system 30, and/or the compactor 50, for example.

Figure 5:
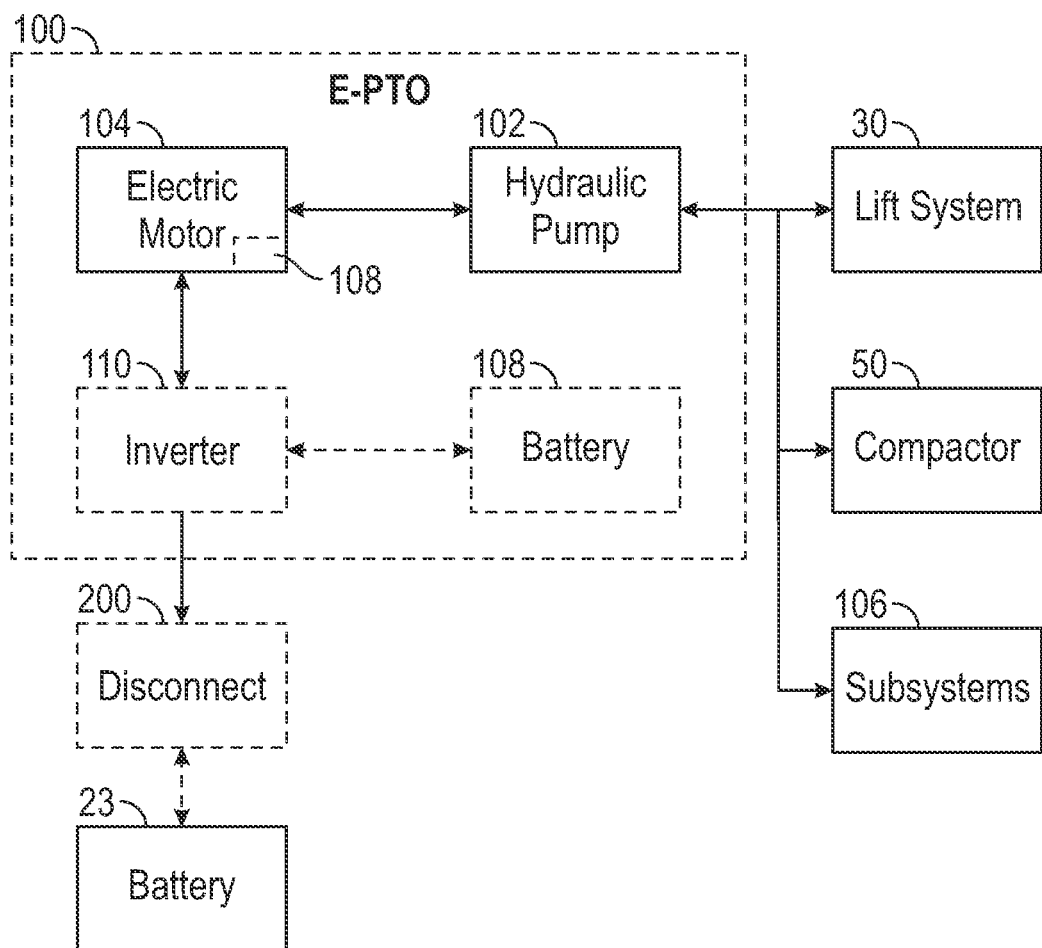
FIG. 5 is a schematic view of a control system of the refuse vehicle of FIG. 3.

The refuse truck 10 can be considered a hybrid refuse vehicle as it includes both electric and hydraulic power systems. As depicted in FIGS. 3-5, the refuse truck 10 includes an E-PTO system 100. The E-PTO system 100 is configured to receive electrical power from the batteries 23 and convert the electrical power to hydraulic power. In some examples, the E-PTO system 100 includes an electric motor 104 driving a hydraulic pump 102. The hydraulic pump 102 pressurizes hydraulic fluid onboard the refuse truck 10, which can then be supplied to various hydraulic cylinders and actuators present on the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to one or more hydraulic cylinders controlling the compactor 50. In still further embodiments, the hydraulic pump 102 provides pressurized hydraulic fluid to the hydraulic cylinders that control a position and orientation of the tailgate 26. The hydraulic pump 102 can be used to supply hydraulic fluid from an onboard hydraulic fluid reservoir to all of the different hydraulic systems on the refuse truck 10. Although depicted as a single hydraulic pump 102, various embodiments of the refuse truck 10 include two or more hydraulic pumps 102 that can be used to direct hydraulic fluid throughout the hydraulic circuit of the refuse truck 10.

With continued reference to FIG. 5, the refuse truck 10 can include a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to the electric motor 104 or an inverter 110 that is coupled to the electric motor 104 to convert DC power from the batteries 23 to AC power for use in the electric motor 104. Without electrical power from the batteries 23, the electric motor 104 will not drive the hydraulic pump 102. Pressure within the hydraulic system will gradually decrease, such that none of the lifting system 30, compactor 50, or vehicle subsystems 106 relying upon hydraulic power will be functional. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities.

The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain optional even when the E-PTO system 100 is not receiving electrical power from the batteries 23. In some examples, the E-PTO system 100 operates independently of the battery 23, and includes its own dedicated secondary battery 108 that supplies DC electrical power to the inverter 110, which converts the DC electrical power to AC electrical power that can then be supplied to the electric motor 104. In still further embodiments, the dedicated secondary battery 108 is directly coupled to the electric motor 104 and supplies DC electrical power directly to the electric motor 104. With the secondary battery 108 present within the E-PTO system 100, the E-PTO system can be agnostic to the chassis type, and can be incorporated into all-electric, hybrid, diesel, CNG, or other suitable refuse vehicle chassis types.

The E-PTO system 100 and energy storage devices (e.g., batteries 23, 108) can be positioned about the refuse truck 10 in various different places to provide external accessibility to a user regardless of a vehicle state (e.g., filled with refuse, empty, etc.) For example, and with reference to FIG. 6, the E-PTO system 100 can be housed within and received beneath a canopy 62. The canopy 62 is formed within the body assembly 14 and extends forward from the on-board receptacle 16 and over at least a portion of the cab 18.

Figure 6:
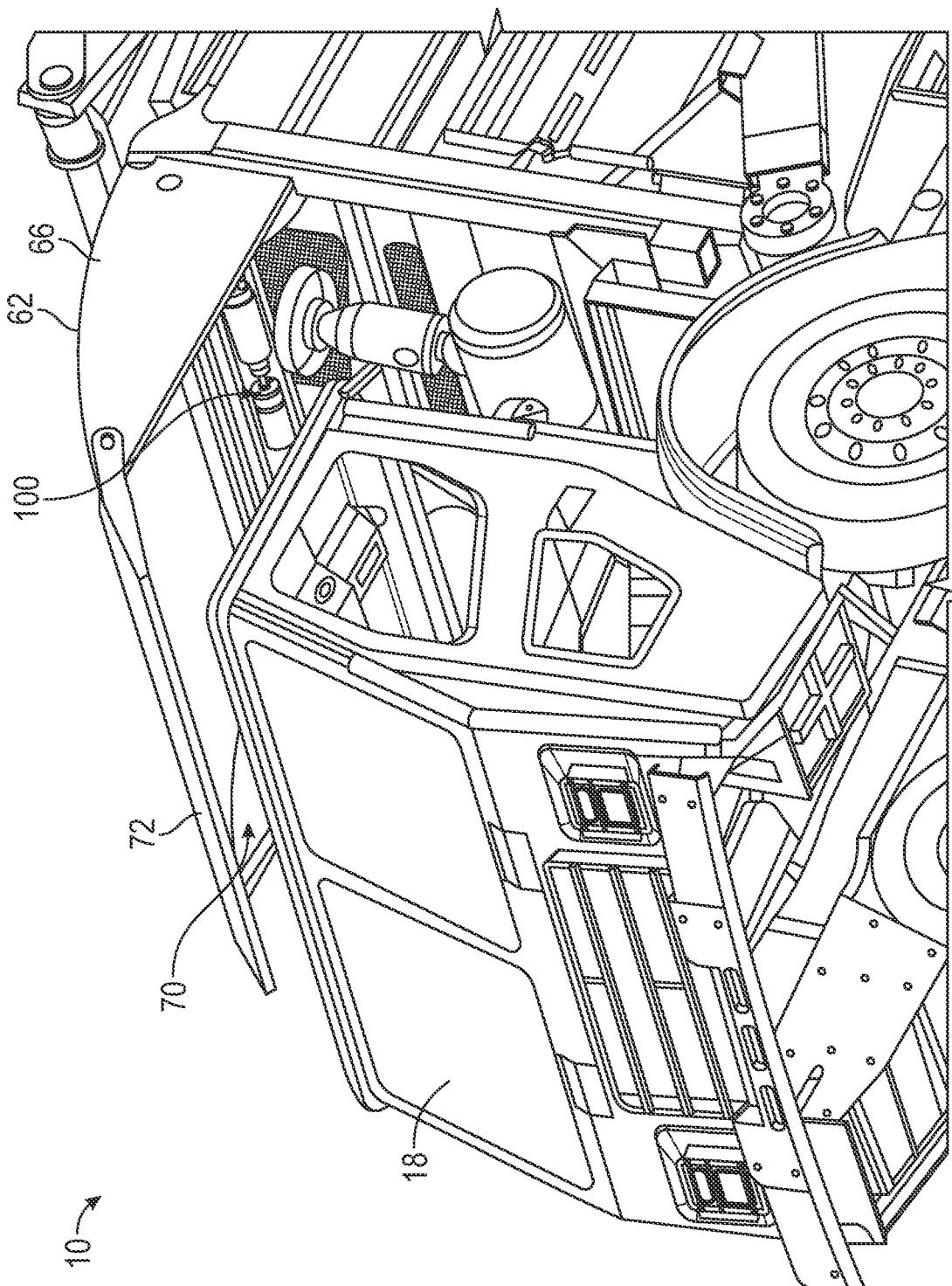
FIG. 6 is a bottom perspective view of a front of the refuse vehicle of FIG. 3, detailing a first packaging for an electric power take-off (E-PTO) system, according to an exemplary embodiment.

The canopy 62 is defined by two generally triangular side walls 66 and an arcuate roof 68 extending between the two side walls 66. The side walls 66 and roof 68 together define a hollow cavity 70 beneath the canopy 62 that can receive the E-PTO system 100 or components of the E-PTO system 100 (e.g., the secondary battery 108, electric motor 104 and hydraulic pump 102, etc.). The roof 68 and side walls 66 collectively protect the E-PTO system 100 from the external environment while also providing open air access for cooling the system. In some examples, the canopy 62 further includes a protective shield 72 extending forward from the roof 68 and the side walls 66. The protective shield 72 can be hingedly coupled to the side walls 66 and extends tangentially with the roof 68 to increase the overhang over the cab 18 of the refuse truck to further defend the E-PTO system 100 from debris or external elements during operation of the refuse truck 10. The protective shield 72 can rotate upward and rearward about the hinges on the side walls 66 to selectively provide access into the hollow cavity 70 so that a worker can access and perform maintenance on the E-PTO system 100, for example. The canopy 62 is designed so that even when the protective shield 72 is deployed (e.g., lowered, as shown in FIGS. 3-4 and 6), the canopy 62 does not interfere with or otherwise block motion of the lifting system 30.

The side walls 66 and roof 68 are mounted to and extend away from a front panel of the on-board receptacle 16. In some examples, the side walls 66 and roof 68 are removably coupled (e.g., bolted to the on-board receptacle 16). Alternatively, the side walls 66 can be hingedly mounted to the on-board receptacle 16, which allows the side walls 66 and the roof 68 (e.g., the entire canopy 62) to rotate upward and rearward relative to the on-board receptacle to allow increased access to the area beneath the canopy 62. By positioning components of the E-PTO system 100 within the cavity 70 beneath the canopy 62, direct access to these components is maintained regardless of status of the vehicle.

With reference to FIGS. 7-11, the E-PTO system 100 and/or energy storage devices (e.g., batteries 23, 108) can be positioned within a housing 60 above or within the on-board receptacle 16. The housing 60 generally includes a triangular perimeter defined by a top panel 74, two triangular side panels 76, an angled panel 78, and a mounting panel 80 that together define a housing cavity 82 that receives the E-PTO system 100 or components of the E-PTO system 100. The side panels 76 extend away from the mounting panel 80 approximately parallel to one another. The top panel 74 and angled panel 78 each span the distance between the side panels 76 to define a waterproof enclosure. The triangular shape of the side panels 76 are such that a height of the housing cavity 82 decreases as a depth of the housing cavity 82 increases. Accordingly, the height of the housing cavity 82 defined by the housing 60 is at a maximum nearest the mounting panel 80 and hopper 52 and is at a minimum at its opposite end, near the joint formed between the angled panel 78 and the top panel 74. Because the housing 60 defines a fully-enclosed cavity 82, the interior of the on-board receptacle 16 (e.g., the collection chamber 28) can be readily washed without a substantial risk of water damage to electrical components (e.g., the electrical motor 104, the inverter 110, the battery 108, the battery 23, wire connections, etc.) that are stored within the housing 60. Similarly, the fully-enclosed nature of the housing 60 prevents unwanted contaminants from entering into the housing 60. In some alternative examples, the angled panel 78 includes drainage holes configured to direct any accumulated moisture (e.g., water) out of the housing.

The location of the housing 60 has a minimal impact on the capacity of the on-board receptacle 16. As depicted in FIGS. 7-11, the housing 60 and E-PTO system 100 is received within the front of the collection chamber 28 of the on-board receptacle 16, directly below the roof panel (e.g., the cover 24) of the on-board receptacle. Although the housing 60 extends into the collection chamber 28, locating the housing 60 along the front and top of the on-board receptacle 16 places the housing 60 within space that typically is not occupied by refuse because of the way refuse is typically transferred into the refuse truck 10.

Figure 8:
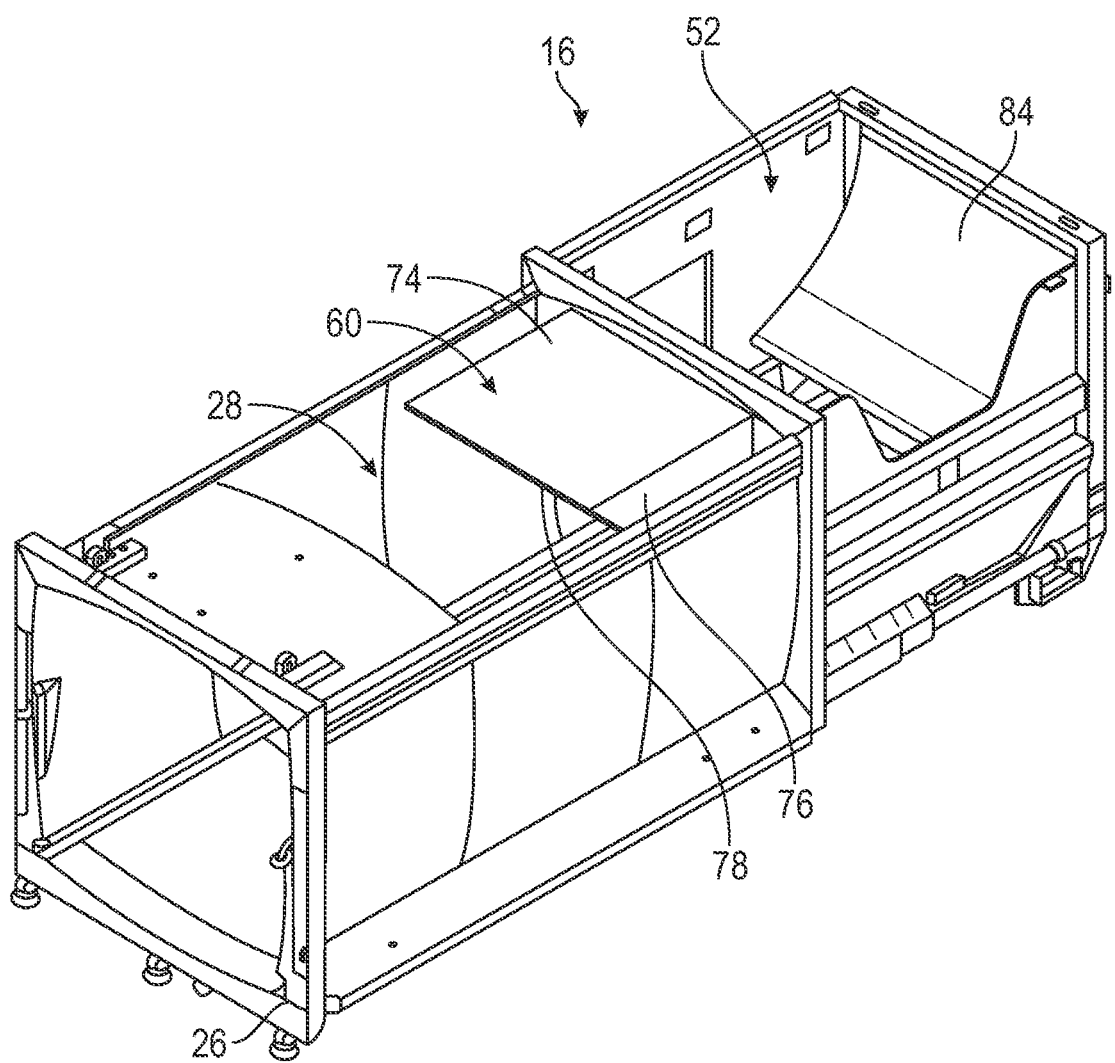
FIG. 8 is a top perspective view of the body assembly of FIG. 7 with a roof panel of the body assembly removed.
Figure 9:
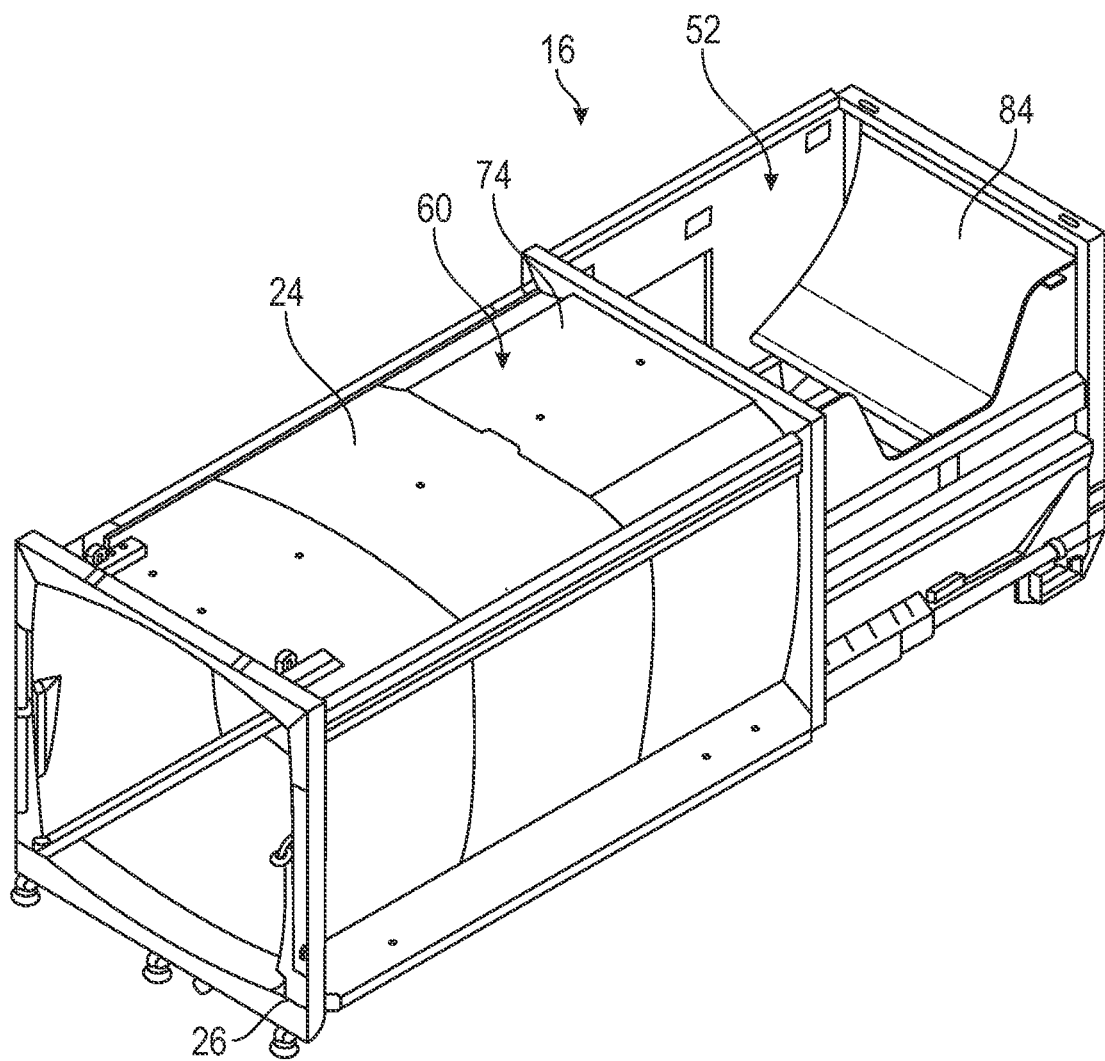
FIG. 9 is a top perspective view of the body assembly of FIG. 7 with the roof panel shown.

With specific reference to FIGS. 8-9, the on-board receptacle 16 is provided with a ramp 84 positioned within a hopper 52. The hopper 52 is coupled to the collection chamber 28 and extends away from a front wall of the collection chamber 28. The ramp 84 directs refuse downward and rearward from the hopper 52, through a passage formed within the front wall of the collection chamber 28, and into the collection chamber 28 when refuse is emptied from a refuse container (e.g., by a lifting system, like the lifting system 30). Once refuse has been directed downward and rearward into the collection chamber 28, the compactor 50 pushes the refuse further backward, toward the tailgate 26 of the vehicle. Because refuse within the on-board receptacle 16 is pushed from a location on the floor of the collection chamber 28 rearward, toward the tailgate 26 for compaction, refuse fills the collection chamber 28 from the tailgate 26 forward. Accordingly, refuse will only be present at the front end of the collection chamber 28 when the on-board receptacle 16 approaches a maximum capacity. The ramp 84 and compactor 50 operate so that the top, front portion of the collection chamber 28 will be the last location to receive refuse. Accordingly, this normally dead space can be used for the housing 60 and E-PTO system 100 without significantly impacting the capacity of the refuse truck 10.

Figure 7:
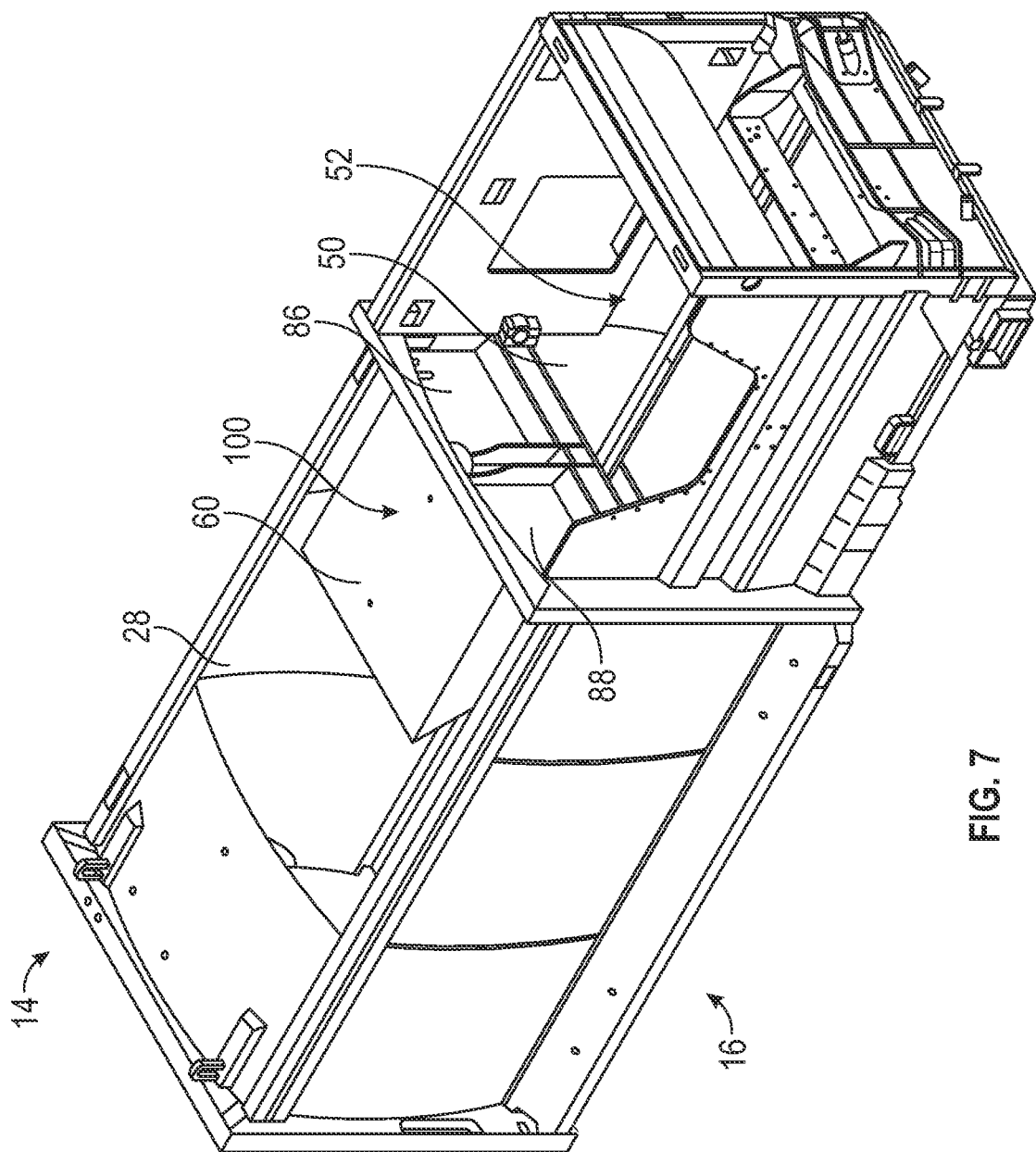
FIG. 7 is a top perspective view of a body assembly of the refuse vehicle of FIG. 3, depicting a second packaging for the E-PTO system, according to another exemplary embodiment.
Figure 10:
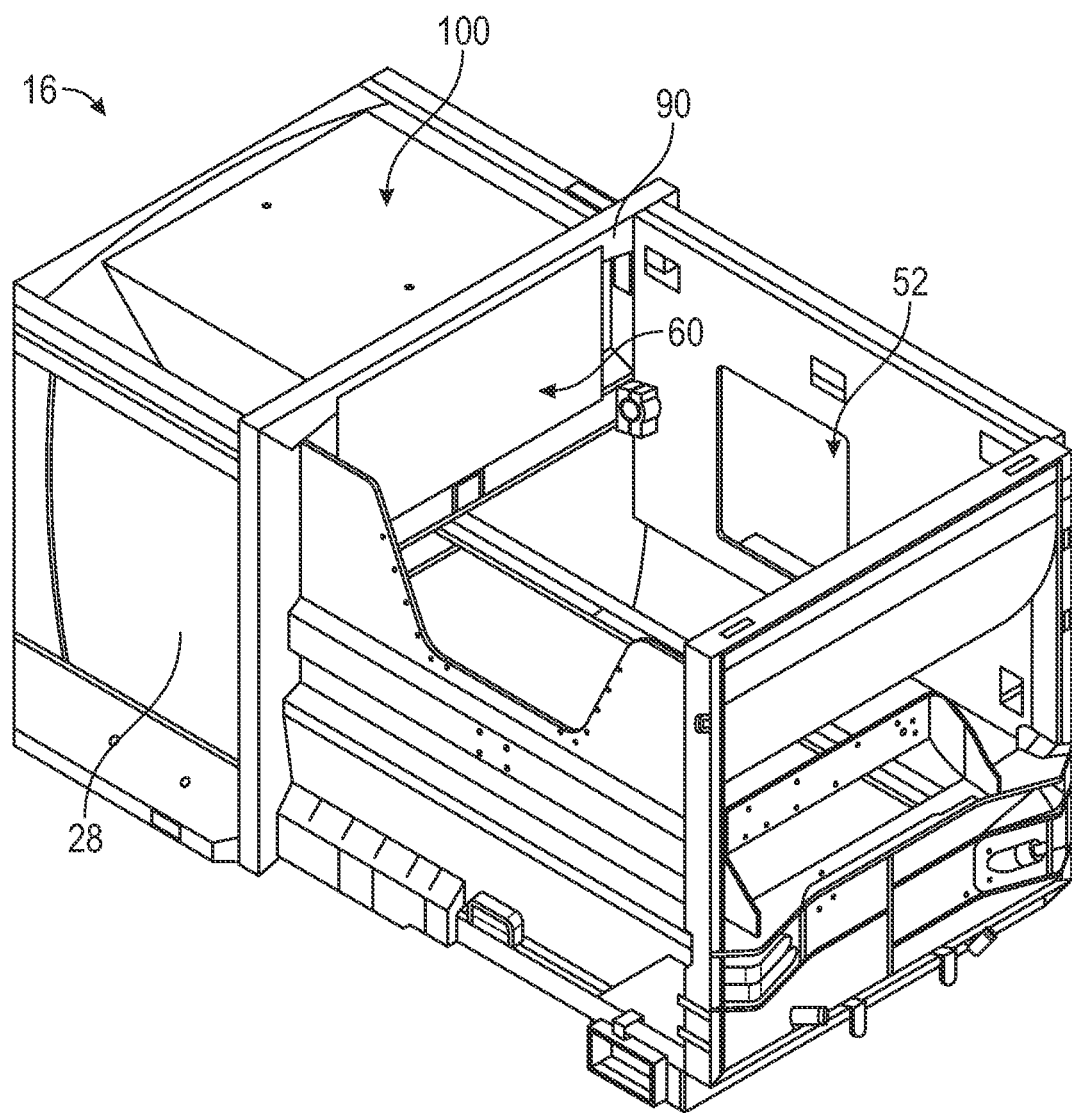
FIG. 10 is a top perspective view of the body assembly of FIG. 7, depicting the second packaging for the E-PTO system.

In some examples, the housing 60 can be accessed through the hopper 52 of the refuse truck 10. The housing 60 can be accessed, in part, through a second passage formed through the front wall of the collection chamber 28. As depicted in FIG. 7, the mounting panel 80 can be at least partially aligned with the second passage formed through the front wall of the collection chamber 28. The mounting panel 80 can include one or more doors 86, 88 that provide access into the housing 60 through the second passage. The doors 86, 88 can be hingedly coupled together and can rotate inward, toward the hopper 52 to provide selective access into the housing 60 through the second passage. The doors 86, 88 are accessible through the hopper 52, so that a worker can access the internal components (e.g., the E-PTO system 100) regardless of the fill level of the collection chamber 28. As depicted in FIG. 10, a cover 90 can be positioned in front of the doors 86, 88 to protect the doors 86, 88 from opening when the housing 60 is not being accessed. The cover 90 can further protect the housing from being impacted or otherwise affected by refuse as the refuse is transferred into the hopper 52 and into the collection chamber 28. In some examples, the cover 90 is hingedly coupled to the on-board receptacle 16 and rotatable between a deployed position (e.g., extending across the doors 86, 88) and a stowed position (e.g., rotated downward, allowing access to the doors 86, 88). Alternatively, the housing 60 can be positioned within the collection chamber 28 as a drawer-type coupling. The housing 60 is configured to slide inward, toward the hopper 52 to provide access to the internal components within the cavity 82. In such embodiments, the top panel 74 can be omitted or can be arranged to allow access into the cavity 82 (e.g., via a door). Optionally, the housing 60 can form a portion of the cover 24, which allows external access into the housing 60 by one or more doors formed within the housing 60. In still other embodiments, the cover 24 is movable (e.g., slidable) relative to the on-board receptacle 16 to permit access to the housing 60 for maintenance of the components received within the cavity 82. Accordingly, the E-PTO system 100 may be accessed through one or more of the cover 24 and the front panel of the on-board receptacle 16.

One or more components of the E-PTO system 100 can also be positioned within a dedicated housing 64 alongside the vehicle body 14, as depicted in FIGS. 3-4. Although the E-PTO system 100 may be in electrical communication with the batteries 23, the E-PTO system 100 is separate from and spaced apart from the vehicle frame 12. The housing 64 can be a cabinet-style housing that includes a door 92 extending coplanar with the outside of the on-board receptacle 16. The door 92 can be opened to permit access into the housing 64, which again readily allows access to the E-PTO system 100 components and batteries 23, 108 for easy maintenance and replacement. The door 92 can be locked so that the E-PTO system 100 components are protected from the external environment. As depicted in FIGS. 3-4, the cabinet-style housing and E-PTO system 100 can be positioned alongside the on-board receptacle 16, between a front axle and a rear axle of the refuse vehicle 10. Additionally, the cabinet-style housing can be positioned behind the arms of the lifting system. Although described as housing the E-PTO system 100, in some examples, the cabinet-style housing receives and secures the disconnect 200. Accordingly, a worker can easily access and disconnect the E-PTO system 100 from the battery 23 before climbing up the refuse truck 10 (e.g., using the ladder alongside the refuse truck 10) to access the housing 60 or the cavity defined by the canopy 62 in order to interact with the E-PTO system 100 received therein.

Each of the housings 60, 64 and/or the canopy 62 can include thermal management systems 202 that are configured to supply cooling air to the components of the E-PTO system 100 received within the housings 60, 64 or beneath the canopy 62. In some examples, fans are included within the housings 60, 64 to drive cooling air over the components of the E-PTO. In other examples, a heat exchanger can be provided to the housing to remove generated heat from within the housings 60, 64. The housings 60, 64 can be provided with vents to permit ambient air to pass through into the housings 60, 64 as well. In some examples, the thermal management system 202 includes a radiator.

Using the previously described systems and methods, a refuse truck can be effectively outfitted with an E-PTO system that can convert electrical power to hydraulic power to provide pressurized hydraulic fluid to various subsystems on the vehicle. The E-PTO system can be packaged and retrofit onto existing refuse trucks and can be incorporated into various different vehicle chassis types. The E-PTO system can be powered by an auxiliary or self-contained power source, or can draw power from the main battery of the vehicle. By integrating the E-PTO system and housings into the structure of the body assembly (e.g., within or along the on-board receptacle 16, above the cab 18, etc.), the E-PTO system occupies otherwise unused or "dead" space so that the capacity of the refuse truck is not compromised. The E-PTO is also protected from external contaminants (e.g., refuse, precipitation, etc.) that might otherwise cause damage to the E-PTO. The different E-PTO packaging options permit access to the E-PTO regardless of the fill level of the on-board receptacle 16, which allows maintenance activities to be performed as desired.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and packaging incorporated into any type or variation of refuse vehicle. Additionally, the E-PTO system and packaging can be implemented into additional locations within the vehicle. For example, components of the E-PTO system or the batteries can also be positioned within the vehicle fenders, behind the cab of the refuse truck, or mounted to the chassis.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
   a chassis;
   an energy storage device supported by the chassis and configured to provide electrical power to a prime mover, wherein activation of the prime mover selectively drives the refuse vehicle;
   a body for storing refuse therein supported by the chassis; and
   an electric power take-off system positioned on the body, the electric power take-off system including an inverter, an electric motor, and a hydraulic pump driven by the electric motor, wherein the inverter receives electrical power from the energy storage device and supplies electrical power to the electric motor, and wherein the electric motor drives the hydraulic pump to convert the electrical power into hydraulic power,
   wherein each of the electric motor and the hydraulic pump are positioned within a housing, and
   wherein a thermal management system is received within the housing and configured to facilitate heat transfer from the housing.

2. The refuse vehicle of claim 1, wherein the inverter receives direct current power from the energy storage device and supplies alternating current power to the electric motor.

3. The refuse vehicle of claim 1, wherein the housing is positioned within a refuse receptacle of the body.

4. The refuse vehicle of claim 1, wherein the housing is a cabinet housing positioned along the body.

5. The refuse vehicle of claim 1, wherein the thermal management system includes a fan.

6. The refuse vehicle of claim 1, wherein the thermal management system includes a radiator.

7. The refuse vehicle of claim 1, wherein hydraulic power produced by the electric power take-off system is used to operate a compactor on the refuse vehicle.

8. A vehicle comprising:
   a chassis;
   an energy storage device supported by the chassis and configured to provide electrical power to a prime mover, wherein activation of the prime mover selectively drives the vehicle;
   a body defining a storage compartment supported by the chassis; and
   an electric power take-off system positioned on the body, the electric power take-off system including an inverter, an electric motor, and a hydraulic pump driven by the electric motor, wherein the inverter receives electrical power from the energy storage device and supplies electrical power to the electric motor, and wherein the electric motor drives the hydraulic pump to convert the electrical power into hydraulic power,
   wherein each of the electric motor and the hydraulic pump are positioned within a housing, wherein the housing is positioned on the body, and
   wherein a thermal management system is received within the housing and configured to facilitate heat transfer from the housing.

9. The vehicle of claim 8, wherein the inverter receives direct current power from the energy storage device and supplies alternating current power to the electric motor.

10. The vehicle of claim 8, wherein the housing is positioned within a refuse receptacle of the body.

11. The vehicle of claim 8, wherein the housing is a cabinet housing positioned along the body.

12. A refuse vehicle comprising:
    a chassis;
    an energy storage device supported by the chassis and configured to provide electrical power to a prime mover, wherein activation of the prime mover selectively drives the refuse vehicle;
    a receptacle for storing refuse therein supported by the chassis;
    an electric power take-off system positioned on the receptacle, the electric power take-off system including an inverter, an electric motor, and a hydraulic pump driven by the electric motor, wherein the inverter receives electrical power from the energy storage device and supplies electrical power to the electric motor, and wherein the electric motor drives the hydraulic pump to convert the electrical power into hydraulic power;
    a lifting system movable relative to the receptacle using hydraulic power from the electric power take-off system; and
    a compactor positioned within the receptacle and movable relative to the receptacle using hydraulic power from the electric power take-off system,
    wherein each of the electric motor and the hydraulic pump are positioned within a housing, wherein the housing is positioned on the receptacle, and
    wherein a thermal management system is received within the housing and configured to facilitate heat transfer from the housing.

13. The refuse vehicle of claim 12, wherein a disconnect is positioned between the energy storage device and the inverter, wherein the disconnect is configured to electrically decouple the energy storage device from the electric power take-off system.

14. The refuse vehicle of claim 12, wherein the inverter receives direct current power from the energy storage device and supplies alternating current power to the electric motor.

* * * * *